US 6,599,421 B1

(12) United States Patent
Freidinger

(10) Patent No.: US 6,599,421 B1
(45) Date of Patent: Jul. 29, 2003

(54) REVERSING VALVE FOR A FILTER ARRANGEMENT WITH AT LEAST TWO FILTER CHAMBERS

(75) Inventor: Martin Freidinger, Saarbrucken (DE)

(73) Assignee: Hydac Filterechnik GmbH, Sulzbach (DE)

( * ) Notice: Subject to any disclaimer, the term of this patent is extended or adjusted under 35 U.S.C. 154(b) by 0 days.

(21) Appl. No.: 09/720,995
(22) PCT Filed: Aug. 24, 1999
(86) PCT No.: PCT/EP99/06194
§ 371 (c)(1), (2), (4) Date: Jan. 3, 2001
(87) PCT Pub. No.: WO00/27502
PCT Pub. Date: May 18, 2000

(30) Foreign Application Priority Data

Nov. 6, 1998 (DE) .......................................... 198 51 193

(51) Int. Cl.$^7$ ...................... B01D 35/12; B01D 35/157; B01D 35/31; F16K 31/60; F16K 35/02
(52) U.S. Cl. ........................................ 210/340; 210/418
(58) Field of Search ................................ 210/340, 341, 210/418

(56) References Cited

U.S. PATENT DOCUMENTS 5,073,260 A * 12/1991 Wilkendorf

FOREIGN PATENT DOCUMENTS

DE 40 11 419 A 10/1991
EP 0 569 931 A 11/1993

* cited by examiner

Primary Examiner—Thomas M. Lithgow
(74) Attorney, Agent, or Firm—Roylance, Abrams, Berdo & Goodman, LLP

(57) ABSTRACT

A filter arrangement includes at least two filter chambers that are alternately impinged upon through the activation of a reversing valve, a manually operated reversing lever, a compensation valve which can be activated for pressure compensation between the filter chambers, and a detent device to enable the reversing valve to be activate in dependence on the activation of the compensation valve. The reversing lever is configured in the form of a two-armed pivoted lever mounted on the reversing valve so that it can pivot such that the lever arm facing away from the handle part of the reversing lever activates the compensation valve during the pivoting movement. The second lever arm forms the handle part and moves the detent device out of its locking position and into the release position enabling the activation of the reversing valve.

21 Claims, 3 Drawing Sheets

REVERSING VALVE FOR A FILTER ARRANGEMENT WITH AT LEAST TWO FILTER CHAMBERS

FIELD OF THE INVENTION

The present invention relates to a filter arrangement having at least two filter chambers which can be alternately impinged upon by activation of a reversing valve. The reversing valve can be set in the corresponding suitable positions upon rotation. The rotatable valve part is connected with a reversing lever having a manually operable handle part. A compensation valve can be activated to provide pressure compensation between the filter chambers. A detent device can be converted into a locking position blocking the rotary movement of the valve part and dependent upon activation of the compensation valve can be converted into a release position permitting the rotary movement of the valve part.

BACKGROUND OF THE INVENTION

Facilitating activation of a filter arrangement using only one hand is intended to avoid requiring that the operator to use both hands to activate the reversing procedure, which two-handed procedure involves one hand to rotate ht reversing lever and a second hand to hold the detent device in the release setting. A filter arrangement allowing one-handed reversal is disclosed in DE 40 11 419 C2. An operating member of the detent device is mounted movably on the reversing lever such that, with gripping of the handle part of the reversing lever, this operating member can be engaged simultaneously with the engagement of the handle part of the reversing lever and can be moved into the position corresponding with the release position of the detent device.

With this previously disclosed filter arrangement, the advantage of the possibility of one-hand manual activation must be purchased at the cost of the involvement of the necessary, but cumbersome, structure of the reversing lever. On the handle part of the reversing lever, the activation member of the detent device is arranged movably as an additional structural part and is pre-biased by a spring arrangement in the position corresponding to the detent or locking position of the detent device.

SUMMARY OF THE INVENTION

Objects of the present invention are to provide a filter arrangement having a simplified structure that can be operated to reverse with the operator using only one hand.

The foregoing objects are attained with a filter arrangement having a reversing lever constructed in the form of a double-armed pivot lever and mounted on the valve part with its pivot axis perpendicular to its rotary axis. In this manner, its lever arm part more distant from the handle part, during the pivot movement, impinges upon the compensation valve. The second lever arm forming the handle part during the pivot movement of the reversing lever activating the compensation valve converts or moves the detent device out of the locking position into the release position.

The two-armed pivot lever is provided as reversing lever. This pivot lever is connected with the valve part of the reversing valve upon rotation, and is pivotally movable relative to the valve part. The reversing lever, although it represents a structure of solely one part, performs three functions. These functions include first of all the reversing function for the reversing valve by rotation of its valve part. Secondly, the pivot movement occurring relative to the valve part causes the reversing lever with the second lever arm forming the handle part to unlock and release the detent device. Simultaneously, as a third function, the other lever arm activates the compensation valve. In other words, the present invention allows activation using one single hand as a result of the one-part construction of the reversing lever, including, without requiring, a movably arranged, spring-biased activation member thereon. This sort of member is required in the conventional filter arrangement for cooperation with the detent device arrangement and with the compensation valve.

In one preferred exemplary embodiment, the detent device has a detent stud projecting outward toward the housing of the filter arrangement. The stud engages force-locking in both of the positions of the reversing valve in each case in a complementary facing detent notch. The detent notch is constructed on the filter housing. In the case of pivotal movement of the reversing lever activating the compensation valve, the detent stud comes free from the relevant facing detent notch.

Preferably, the arrangement, for the activation of the compensation valve, the lever arm of the reversing lever which is more distant from the handle part bears upon a valve tamping rod of the compensation valve. The tamping rod can be pre-biased for force-locking engagement with the associated lever arm of the reversing lever by a spring arrangement. The reversing lever is pushed by the spring arrangement simultaneously in the pivotal position corresponding to the detent lock position of the detent device.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
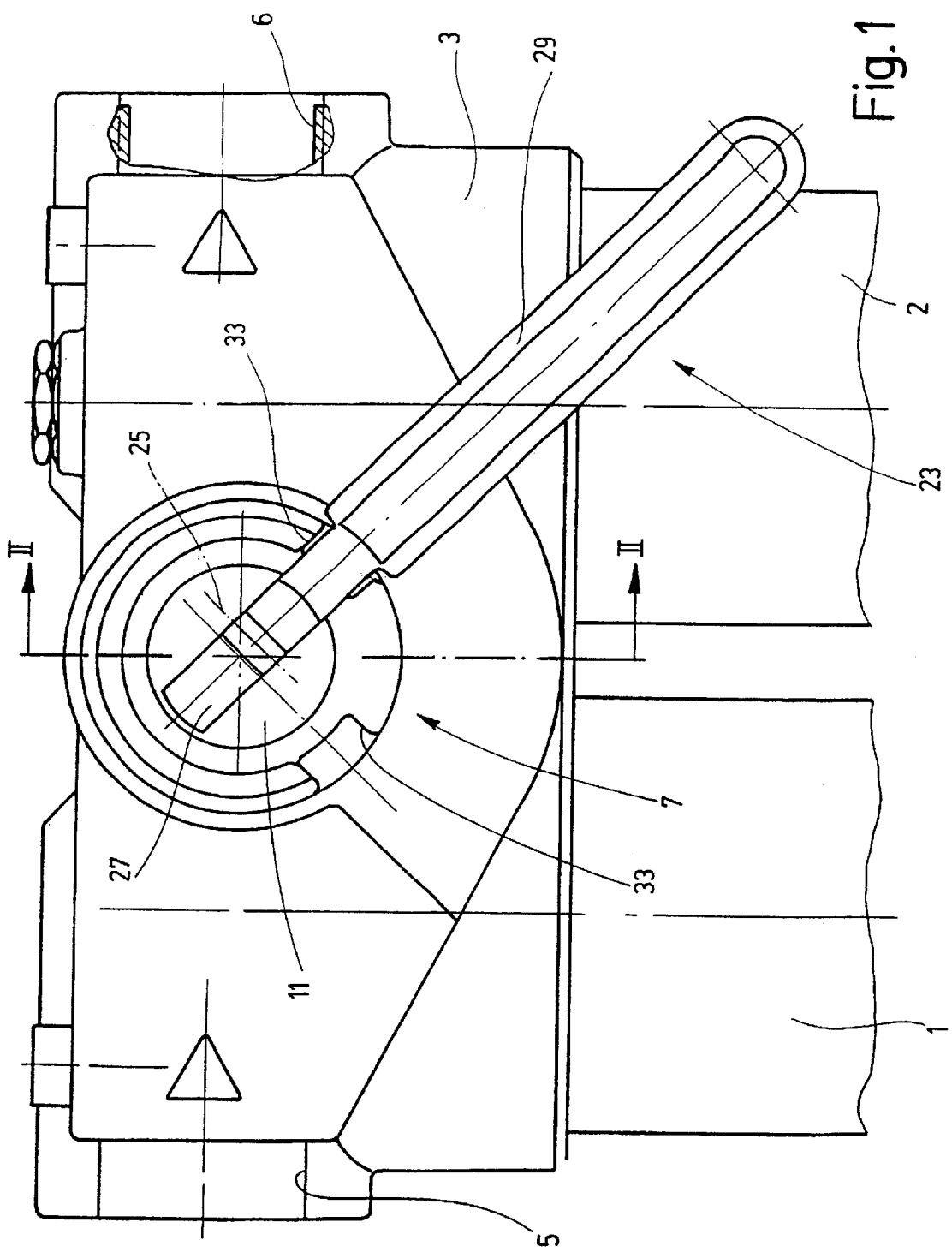
FIG. 1 is a diagrammatic front elevational view, partially in section, of a filter arrangement according to an embodiment of the present invention.
Figure 3:
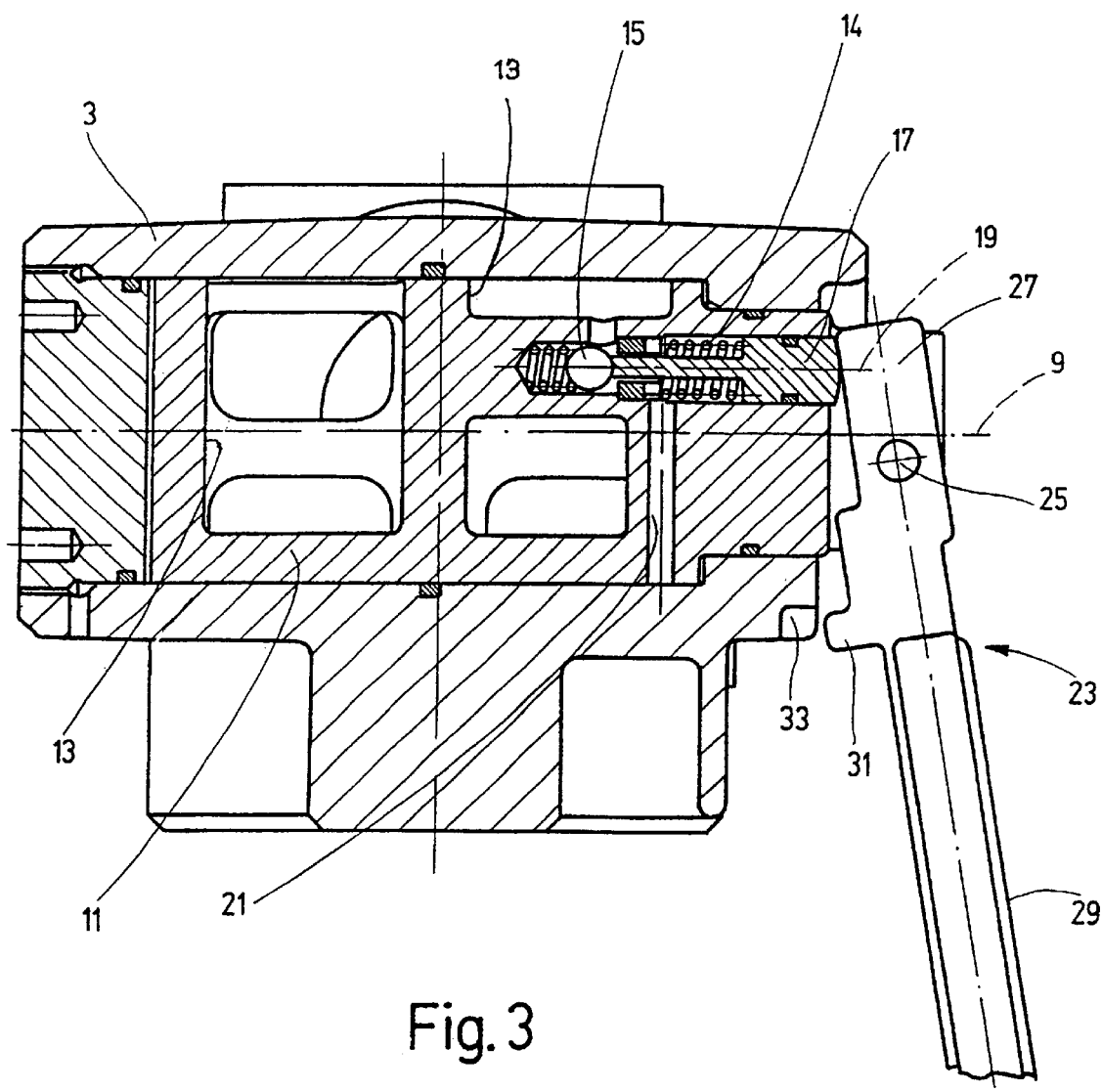
FIG. 3 is a side elevational view in section of the valve arrangement taken along line II—II of FIG. 1 in the same operation position as FIG. 2, but with activation of the compensation valve.

FIG. 1 shows the top part of a filter arrangement with two filter chambers 1 and 2 and a top housing 3. The top housing incorporates connections 5 and 6 for feed-in and discharge of the medium to be filtered, respectively. Also, in housing 3, a reversing device 7 is provided which allows either filter chamber 1 or filter chamber 2 to be placed in operation selectively. More details of the reversing device 7 are illustrated in FIGS. 1 and 3.

As indicated in these drawings, the reversing device includes a reversing valve arrangement having a reversing valve 11 rotatable around a rotary axis 9. The reversing valve body has recesses 13 in its interior to open the flow path through either filter chamber 1 or filter chamber 2 according to the position of valve rotation. Within the body of reversing valve 11, a compensation valve 15 is integrated in the form of a spring-biased ball or check valve. The compensation valve can be impinged upon or engaged by a tamping rod 17, likewise pre-biased by a spring 14. This tamping rod can be thrust counter to the force of spring 14 in a longitudinal direction. The axis 19 of this tamping rod thrust movement extends at some distance from and parallel to rotary axis 9 of the reversing valve.

Figure 2:
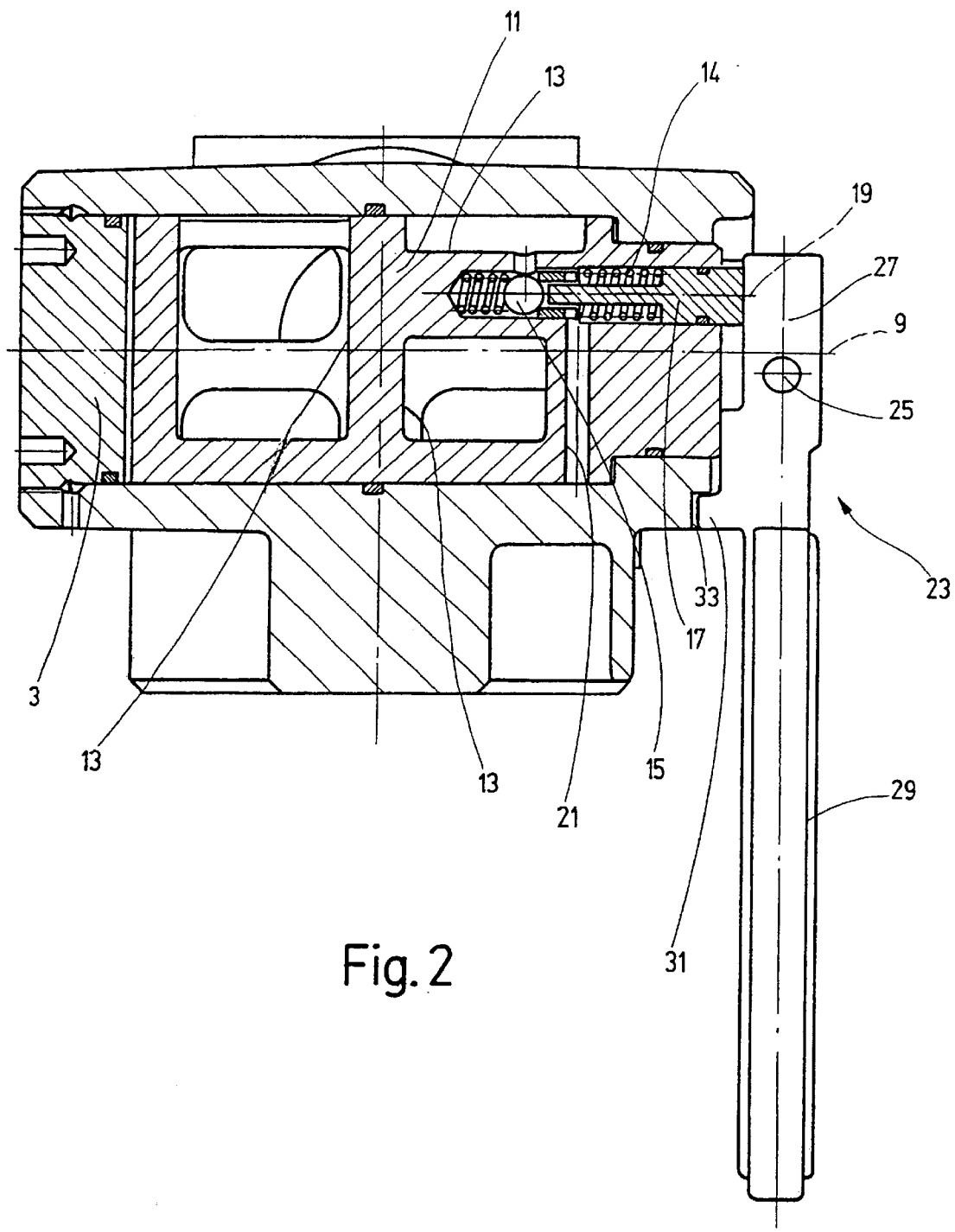
FIG. 2 is a side elevational view in section of the valve arrangement taken along line II—II of FIG. 1 in an operation position without activation of the compensation valve.

FIG. 2 shows the compensation valve 15 in a non-operational locked state. FIG. 3 shows the compensation valve 15 in an operational state, whereby a flow passage 21 allowing for pressure compensation between filter chambers 1 and 2 is opened.

A manually operable reversing lever 23 is provided for activation of reversing device 7 and is arranged on reversing valve 11. The reversing lever is connected with the reversing valve for concurrent rotary movability around rotary axis 9, and is pivotal relative to reversing valve 11 around a pivot axis 25 perpendicular to rotary axis 9. Reversing lever 23 forms a two-armed pivot lever with a short lever arm 27 and a long lever arm which is configured as handle part 29 for the manipulation of reversing lever 23. The short lever arm 27 engages the exterior of tamping rod 17 of compensation valve 15. Spring 14 causes the frictional connection between tamping rod 17 and lever arm 27. The reversing lever 23, on the basis of the biasing spring, assumes the pivot position shown in FIG. 2, in which the reversing valve 11 of reversing device 7 is located in one of two positions for the activation of one of the two filter chambers 1 or 2. With this pivot position of reversing lever 23, a detent study 31, configured on the interior of the handle part 29 facing housing 3, engages in force-locking connection in a detent notch 33, to block rotation of reversing valve 11 around rotary axis 9.

To reverse reversing device 7, the operator grasps handle part 29 of reversing lever 23 and pivots this part counter to the effect of spring 14 on tamping rod 17 and on the short lever arm 27 in the direction away from housing 3. Detent stud 31 moves out of and away from notch 33. Simultaneously, the movement of lever arm 27 activates compensation valve 15 to produce the pressure compensation balance between filter chambers 1 and 2. With detent stud 31 being raised up, reversing lever 23 is now released allowing rotation of reversing valve 11 around rotary axis 9 to accomplish the reversing process. When the position for activation of the alternate filter chamber 1 or 2 has been attained, the handle part 29 need only be released, so that detent stud 31 found on handle part 29 of reversing lever 23 drops back under the influence of spring 14 into the alternate position in the notch 33 associated with the alternate position. Thus, reversing lever 23 again assumes the locked pivot position shown in FIG. 2, in which position compensation valve 15 is closed.

While an embodiment has been chosen to illustrate the invention, it will be understood by those skilled in the art that various changes and modifications can be made therein without departing from the scope of the invention as defined in the appended claims.

What is claimed is:

1. A filter arrangement, comprising
   first and second filter chambers in a filter housing;
   a reversing valve in fluid communication with said filter chambers and moveable between first and second positions for alternatively and selectively actuating said first and second filter chambers, respectively, said valve including a valve part rotatable about a rotary axis;
   a reversing lever coupled to said valve part for simultaneous rotation with said valve part about said rotary axis, said reversing lever having a first lever arm and a second lever arm forming a manually operable handle part and being pivotable relative to said valve part about a pivot axis perpendicular to said rotary axis;
   a compensation valve within said reversing valve controlling fluid pressure compensation between said filter chambers, said compensation valve being activated by pivoting of said reversing lever; and
   a detent device on said reversing lever movable between locking and release positions permitting and preventing rotation of said valve part respectively, by pivoting of said reversing lever, such that said compensation valve is activated when said detent device is moved to the release position.

2. A filter arrangement according to claim 1 wherein said detent device comprises a detent surface on said handle part of said reversing lever, said detent surface engaging in a force-locking manner first and second detents in said filter housing in said first and second positions of said reversing valve, respectively, said detent surface being released from the respective detent upon pivot movement of said reversing lever activating said compensation valve.

3. A filter arrangement according to claim 2 wherein said detent surface on said handle part comprises a pre-biased detent stud; and
   said first and second detents comprise notches in said filter housing.

4. A filter arrangement according to claim 3 wherein a valve tapering rod is mounted in said valve part and can be thrust along an axis parallel to said rotary axis by said lever arm upon pivoting of said reversing lever to activate said compensation valve.

5. A filter arrangement according to claim 2 wherein a valve tapering rod is mounted in said valve part and can be thrust along an axis parallel to said rotary axis by said lever arm upon pivoting of said reversing lever to activate said compensation valve.

6. A filter arrangement according to claim 1 wherein a valve tapering rod is mounted in said valve part and can be thrust along an axis parallel to said rotary axis by said lever arm upon pivoting of said reversing lever to activate said compensation valve.

7. A filter arrangement according to claim 6 wherein said valve tampering rod is pre-biased by a spring working counter to movement of said valve tampering rod for opening said compensation valve and biasing said lever arm of said reversing lever to pivot towards said locking position of said detent device.

8. A filter arrangement according to claim 5 wherein said valve tampering rod is pre-biased by a spring working counter to movement of said valve tampering rod for opening said compensation valve and biasing said lever arm of said reversing lever to pivot towards said locking position of said detent device.

9. A filter arrangement according to claim 4 wherein said valve tampering rod is pre-biased by a spring working counter to movement of said valve tampering rod for opening said compensation valve and biasing said lever arm of said reversing lever to pivot towards said locking position of said detent device.

10. A filter arrangement according to claim 9 wherein said compensation valve is incorporated into said valve part of said reversing valve, said valve part being rotatable.

11. A filter arrangement according to claim 8 wherein said compensation valve is incorporated into said valve part of said reversing valve, said valve part being rotatable.

12. A filter arrangement according to claim 7 wherein said compensation valve is incorporated into said valve part of said reversing valve, said valve part being rotatable.

13. A filter arrangement according to claim 6 wherein said compensation valve is incorporated into said valve part of said reversing valve, said valve part being rotatable.

14. A filter arrangement according to claim 5 wherein valve said compensation valve is incorporated into said valve part of said reversing valve, said a valve part being rotatable.

15. A filter arrangement according to claim 4 wherein said compensation valve is incorporated into said valve part of said reversing valve, said valve part being rotatable.

16. A filter arrangement according to claim 15 wherein said compensation valve comprises a spring-biased ball or check valve.

17. A filter arrangement according to claim 14 wherein said compensation valve comprises a spring-biased ball or check valve.

18. A filter arrangement according to claim 13 wherein said compensation valve comprises a spring-biased ball or check valve.

19. A filter arrangement according to claim 12 wherein said compensation valve comprises a spring-biased ball or check valve.

20. A filter arrangement according to claim 11 wherein said compensation valve comprises a spring-biased ball or check valve.

21. A filter arrangement according to claim 10 wherein said compensation valve comprises a spring-biased ball or check valve.

* * * * *